United States Patent [19]
French

[11] Patent Number: 5,578,751
[45] Date of Patent: Nov. 26, 1996

[54] OCEANOGRAPHIC SENSOR SUITE WET WELL SYSTEM

[75] Inventor: Daniel W. French, Portsmouth, R.I.

[73] Assignee: The United States of America as represented by the Secretary of the Navy, Washington, D.C.

[21] Appl. No.: 530,464

[22] Filed: Dec. 8, 1995

[51] Int. Cl.⁶ .................................................. G01F 1/00
[52] U.S. Cl. ................................. 73/170.29; 73/170.34
[58] Field of Search .......................... 73/170.29, 170.33, 73/170.34

[56] References Cited

U.S. PATENT DOCUMENTS

| | | | |
|---|---|---|---|
| 3,147,431 | 9/1964 | Bennett et al. | 324/62 |
| 3,439,537 | 4/1969 | Pullos | 73/170.29 |
| 3,513,709 | 5/1970 | Pullos | 73/170.29 X |
| 3,538,772 | 11/1970 | Filloux | 73/170.29 X |
| 3,820,391 | 6/1974 | Baker, Jr. et al. | 73/170.29 |
| 4,202,036 | 5/1980 | Bowditch et al. | 73/170.34 X |
| 4,287,763 | 9/1981 | Richard | 73/170.29 X |
| 4,480,323 | 10/1984 | Page | 73/170.29 X |
| 4,780,863 | 10/1988 | Schoepf | 73/170.29 X |
| 5,283,767 | 2/1994 | McCoy | 73/170.34 X |

Primary Examiner—Richard Chilcot
Assistant Examiner—Elizabeth L. Dougherty
Attorney, Agent, or Firm—Michael J. McGowan; James M. Kasischke; Prithvi C. Lall

[57] ABSTRACT

A wet well sensor system includes a housing member having a fluid inlet and a fluid outlet, each formed in a wall of the housing member. A wet well member is positioned within the housing. The wet well includes a canister portion, a cavity formed within the canister, an inlet port formed in an end wall of the canister and an outlet port formed in the same end wall thereof, a plurality of sensor members formed within the wet well canister, each of the plurality of sensors having a dry cable for supplying sensed information to a location exterior of the wet well canister and interior to the housing member. Finally, there are provided braces for stationarily mounting the plurality of sensor members within the wet well and a pump system for circulating fluid from the fluid inlet to the fluid outlet of the housing member and intermediately through the wet well canister such that fluid sensing is entirely contained within the wet well canister.

15 Claims, 4 Drawing Sheets

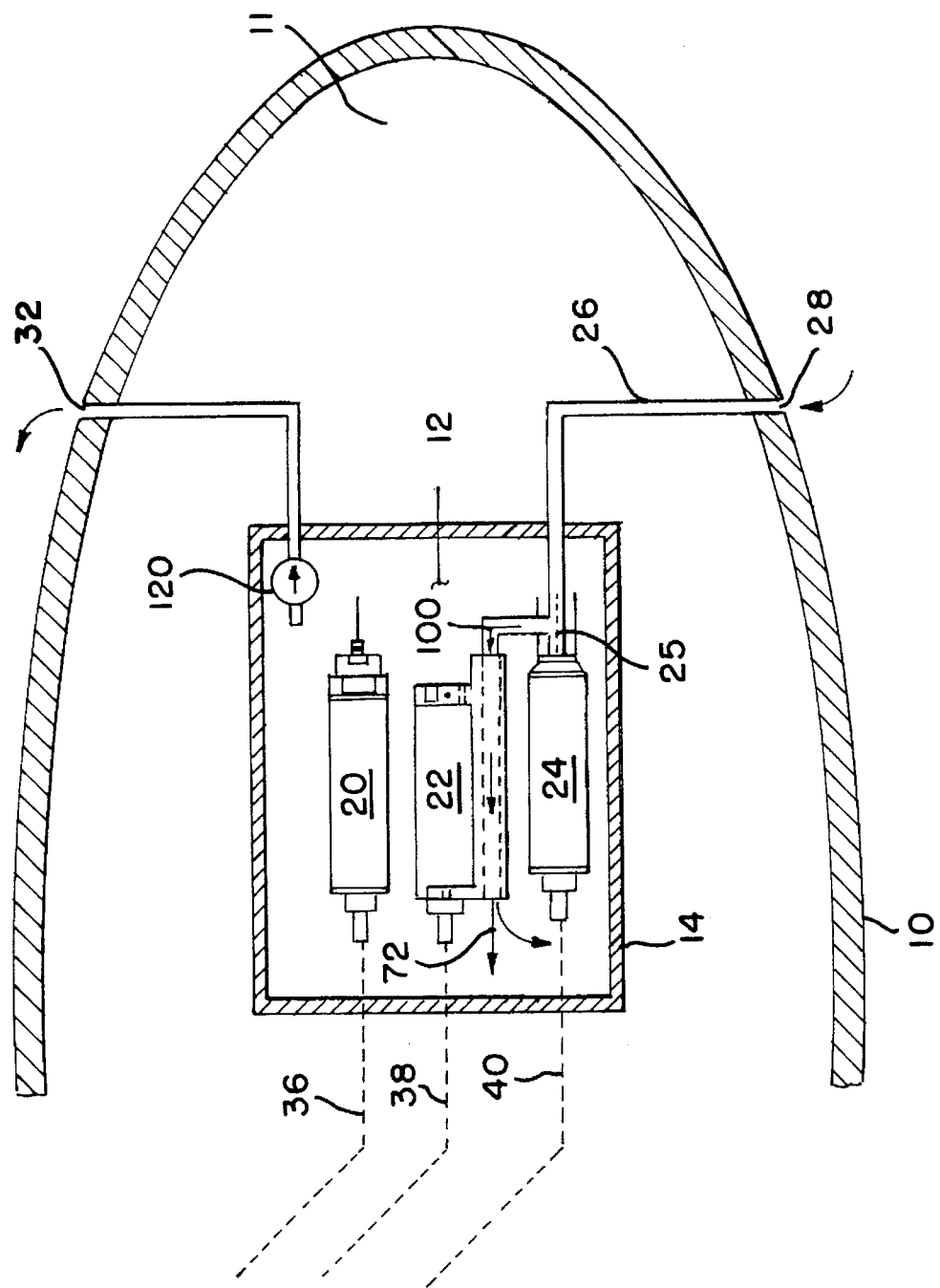

OCEANOGRAPHIC SENSOR SUITE WET WELL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to an oceanographic sensor suite wet well system, and more particularly to a device which provides an internal mounting of sensors in a dry pressure hull of a Large Diameter Unmanned Undersea Vehicle (LDUUV), the sensors accurately operating in a full pressure, free flood environment with circulating water.

(2) Description of the Prior Art

Existing underwater vehicle platforms with oceanographic equipment and sensors that operate in a flooded sea water environment traditionally mount the sensors in a large open flooded area or simply mount the sensors external to the vehicle envelope. The large flooded section in such a vehicle is usually a considerable volume which consists of massive pressure bulkheads and multiple feed-through penetrator lines. This large flooded volume reduces the overall buoyancy of the vehicle. Externally mounted sensors not only distort the hydrodynamic flow around the vehicle, causing increased noise and drag but also eliminate the capability of launching the vehicle through a launch tube.

There has been a need in the art in the area of LDUUV's to integrate oceanographic sensors into the water-tight pressure hull of the vehicle. These oceanographic sensors require exposure to a free flooded sea water environment, and the sensor suite requires the water to circulate at a minimum flow rate in order to ensure that the measured results are accurate. The LDUUV has no flooded hull sections and due to vehicle launch requirements, no equipment may be mounted external to the vehicle.

Known apparatuses for underwater sensing include the following:

U.S. Pat. No. 3,147,431 to Bennett et al. discloses an apparatus for measuring and recording the conductivity of sea water as a function of depth. The apparatus utilized to obtain these measurements includes a torpedo-shaped vehicle having a flooded forward compartment housing a depth-sensing element which moves a recording medium in one direction through a distance proportional to the hydrostatic pressure to which the element is subjected. An air-filled aft compartment of the vehicle contains a conductivity bridge circuit whose output drives an all-seeking servo system which rotates a recording stylus cooperating with the recording medium through an angle which is a function of the value of conductivity, the movement of the stylus being orthogonal to and in the same plane as the movement of the record medium, whereby the combined motion produces a trace of conductivity versus depth as the vehicle is lowered to the sea bottom and retrieved. The only measurement directly received is that of depth, and the device does not operate in a full pressure, free flood environment, with circulating water.

U.S. Pat. No. 3,762,214 to Bogusz discloses a system for monitoring contaminants in liquids in which there is a container open at one end, a plurality of sensors fixedly mounted within the container for sensing characteristics of the fluid and producing electrical signals, data recording means for receiving the electrical signals from the sensors, means within the container for periodically inducing oscillatory displacement of the fluid thereby cleaning the sensors, means for selective excitation of said means for inducing oscillatory displacement, and means for sequentially switching individual ones of said sensors and said data recording means. The system does not provide the capability of providing operation of sensors in a full pressure, free flood environment with circulating water, while maintaining that sensing system within a dry pressure hull. Instead, the sensors are continually and openly exposed to fluid via the opening 66, thereby also precluding selective detection which will occur in applicant's invention.

U.S. Pat. No. 3,824,852 to Otto discloses an electrically powered submerged pump, power circuit therefor, an oceanographic monitoring apparatus and method employing the same. Particularly, the submerged unit monitors water conditions by moving ambient water through a monitoring section for upper outlet passage 22 as shown in FIG. 1 thereof. As shown in Otto, there is provided a main water collecting chamber 16 and an upper float chamber 14, a sensory circuit block 84 being mounted within the float chamber 14 so as to be on a protected dry location. The block 84 is provided with a sensor 86 which projects into the stream of sample fluid passing through the passageway 22. The sensor 86 is connected to its associated block 84 by means of a wire passing through a sealed aperture in the wall 30. In the device of Otto, the pressure sensors per se are not mounted within the wet well as occurs in the present invention. Instead, four pumping chambers only are provided within the wet well or main water collecting chamber 16, whereas the sensors are entirely housed within a dry portion of the device and only include remote sensing elements which extend into the fluid passage 22 as shown in FIG. 1 thereof.

U.S. Pat. No. 4,287,763 to Richard discloses an apparatus for concentrating and sampling substances from sea water in which a relatively large measured volume of sea water is pumped through each of a series of in situ sampling chambers containing filtration, adsorption, absorption, or other retentive material.

The above devices are complicated in structure, tend to be difficult to use, and are, therefore, substantially unacceptable in solving the problem of integrating oceanographic sensors into the water-tight pressure hull of an unmanned undersea vehicle (UUV) such that the oceanographic sensors are exposed to a free flooded sea water environment with the water circulating at a minimum flow rate within the sensor suite in order to ensure accurate measured results.

SUMMARY OF THE INVENTION

Therefore, it is an object of this invention to provide a wet well system for an oceanographic sensor suite which solves the problems found in the above prior art.

Another object of the present invention is to provide fluid sensing within a wet well of the wet well system without exposing a dry environment to fluid.

Still another object of this invention is to provide a wet well system for an oceanographic sensor suite which is adapted for an underwater vehicle.

Still another object of the present invention is to provide sensors within a hull of the underwater vehicle and enable operation of the sensors without flooding the dry hull portion of the vehicle.

In accordance with one aspect of this invention, there is provided a sensor system having a housing member including a fluid inlet and a fluid outlet, each formed in a wall of the housing member. A wet well member is positioned within the housing member. The wet well member includes a canister portion having opposing end walls mounted in a fluid-tight manner thereto. A cavity portion is formed within the canister portion, and an inlet port is formed in a wall of the canister in communication with the fluid inlet of the housing member. An outlet port is also formed in a wall of the canister, and it is in communication with the fluid outlet of the housing member. A plurality of sensor members are positioned within the wet well member, each of the plurality of sensors having a dry cable for supplying sensed information to a location exterior of the wet well member and interior of the housing member. Positioning members are further provided for fixedly mounting the plurality of sensor members within the wet well. Further, a pump is provided for circulating fluid from the fluid inlet to the fluid outlet of the housing member and intermediately through the wet well, such that fluid is entirely contained within the wet well member.

BRIEF DESCRIPTION OF THE DRAWINGS

The appended claims particularly point out and distinctly claim the subject matter of this invention. The various objects, advantages and novel features of this invention will be more fully apparent from reading the following detailed description in conjunction with the accompanying drawings in which like reference numerals refer to like parts, and of which:

FIG. 7 is a functional diagram of an alternate embodiment of the present invention.

DESCRIPTION OF THE PREFERRED EMBODIMENT

Figure 1:
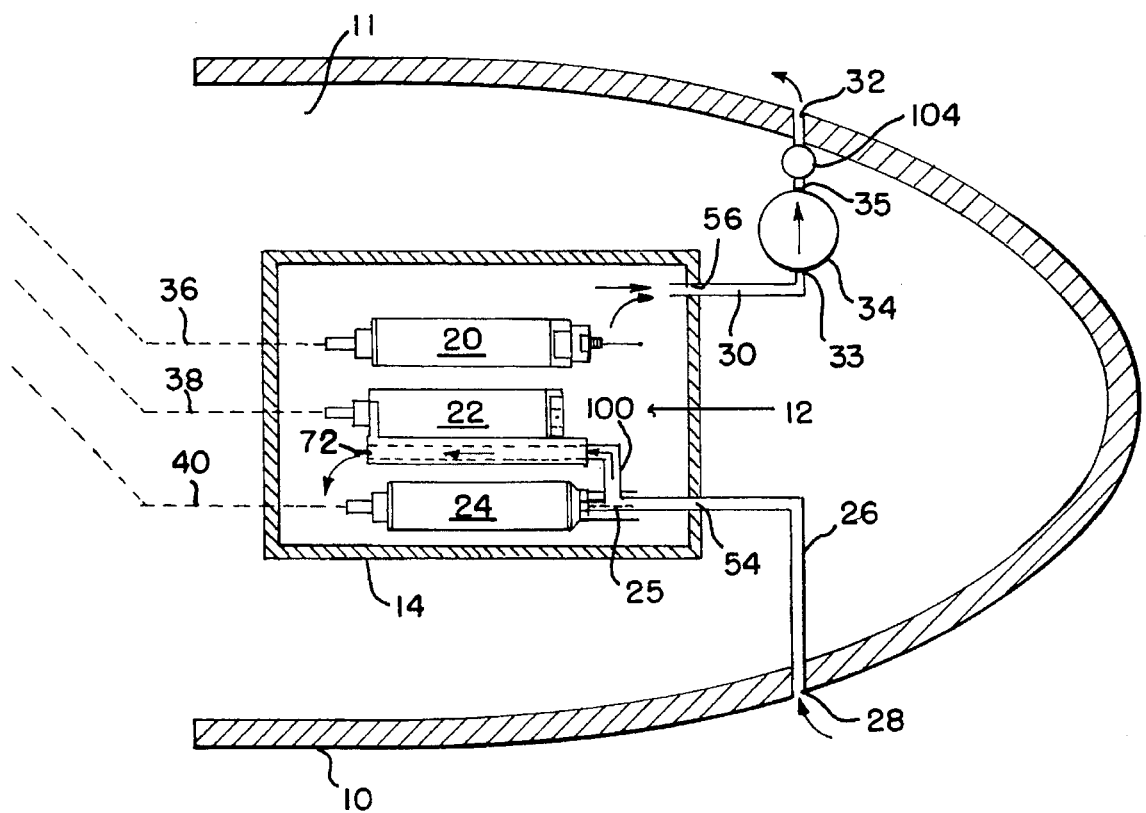
FIG. 1 is a functional diagram of the wet well system for an oceanographic sensor suite according to a preferred embodiment of the present invention.
Figure 2:
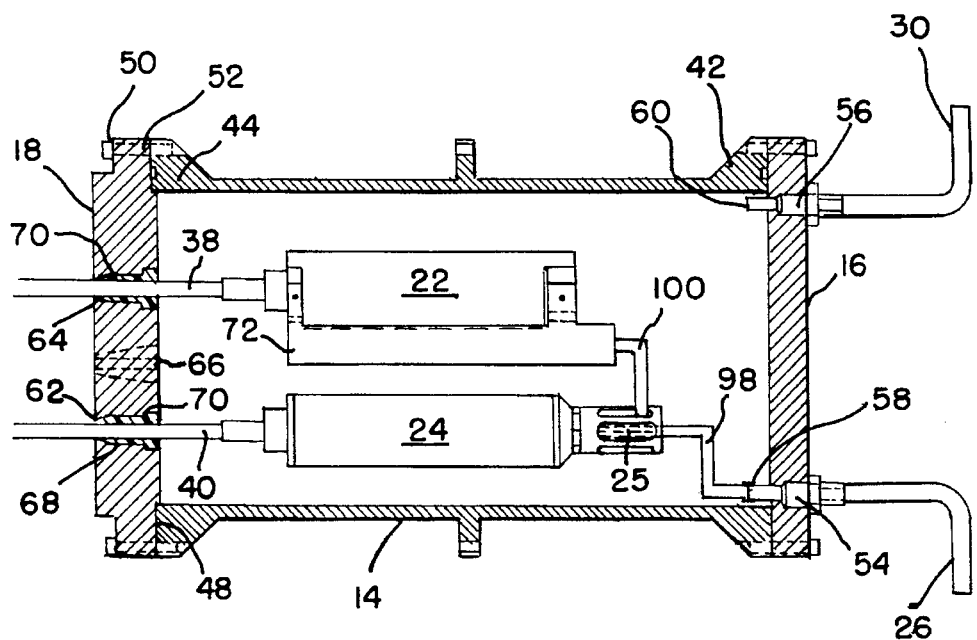
FIG. 2 is a cut-away view of the wet well for the system.

FIG. 1 is a functional diagram of a wet well system for an oceanographic sensor suite according to a preferred embodiment of the present invention. FIG. 2 is a cut-away view of the wet well for the wet well system showing further detail of the wet well system shown within the drawing of FIG. 1.

As shown particularly in FIG. 1, the unmanned undersea vehicle generally includes a pressure hull 10 and a wet well 12 entirely housed within the pressure hull. The pressure hull 10 includes a sea water inlet 28 and a sea water outlet 32 formed in the outer wall thereof and an internal dry volume generally shown at 11.

The wet well 12 is comprised of a wet well canister 14 which is flooded with circulating sea water during operation. More specifically, the wet well canister 14 includes a first end plate 16 and a second end plate 18, the first end plate 16 being disposed at a forward end of the wet well canister 14 as particularly shown in FIG. 2. The second end plate 18 is disposed at a rear or aft end of the wet well canister 14 as also shown in FIG. 2.

Provided within the wet well canister 14 is a pressure sensor 20, a conductivity sensor 22, and a temperature sensor 24, acting as the sensors for the unmanned undersea vehicle. The temperature sensor 24 further includes a temperature probe 25 fixed thereto as shown in FIG. 1. Each of the pressure sensor 20, conductivity sensor 22, and temperature sensor 24 are provided with a dry cable 36, 38, and 40, respectively, leading to inboard equipment within the dry hull 11 of the pressure hull 10.

Additionally provided within the dry hull 11 of the pressure hull 10 is an external pump member 34 having a pump inlet 33 and a pump outlet 35 provided in connection therewith. The pump 34 is connected to an outlet 56 of the wet well canister 14 via a high pressure line 30, the outlet 35 of the pump 34 being directly connected to the outlet port 32 formed in the wall of the pressure hull 10. Additional instrumentation such as a flowmeter 104 can be positioned between pump outlet 35 and outlet port 32.

The inlet port 28 which introduces sea water into the wet well canister 14 is connected to the canister 14 by a high-pressure line 26 acting as the sea water inlet path from the inlet port 28 to an inlet port 54 of the wet well canister 14.

Figure 4:
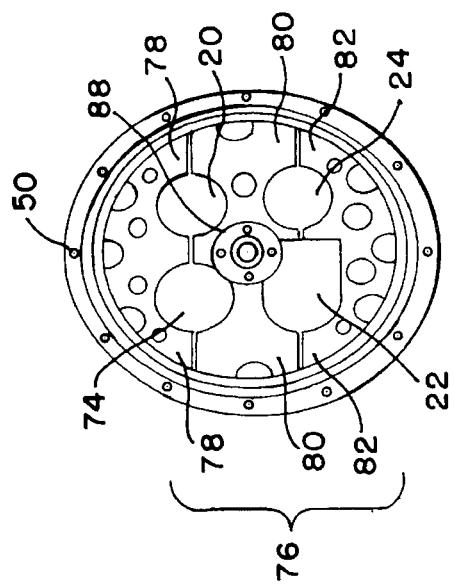
FIG. 4 is an exposed end view taken from line 4—4 in FIG. 3 with the forward end plate removed for clarity.

Referring now more specifically to FIG. 2, the wet well canister 14 having first end plate 16 and second end plate 18 includes a first end flange 42 radially extending from the first end of the wet well canister 14 adjacent to the first end plate 16 and a second end flange 44 radially extending from the wet well canister at a second end thereof adjacent to the second end plate 18. The first end flange 42 is provided with a first O-ring 46, and the second end flange 44 is provided with a second O-ring 48. The end plate members 16 and 18, respectively, seal the first O-ring 46 and second O-ring 48 against the first and second end flanges 42, 44 respectively, in order to provide a fluid tight seal within the wet well canister 14. Each of the end plates 16 and 18 are securely fastened to the flanges 42 and 44 by a plurality of end plate screws 50. Each of the plurality of end plate screws 50 is inserted within a corresponding plurality of threaded holes 52 formed within the end flanges 42 and 44, as shown, for example, in FIG. 4.

An inlet port 54 having a nipple member 58 formed therein is provided within the end plate 16 at a predetermined position thereof, and an outlet port 56 having a nipple 60 formed therein is provided within the first end plate 16 at a second predetermined position thereof.

Each of the nipples 58 and 60 for the inlet port 54 and the outlet port 56, respectively, are provided to enable attachment of internal tubing. Openings 62 and 64 are provided within the second end plate 18 at predetermined locations thereof in order to accommodate the dry cable 40 for the temperature sensor 24 and the dry cable 38 for the conductivity sensor 22, respectively. Additionally shown in phantom, a dry cable opening 66 is provided within the end plate 18 identical in structure to the openings 62 and 64 for passage of the dry cable 36 of the pressure sensor 20 therethrough. Each of the openings 62, 64 and 66 are provided with polyurethane potting for sealing each of the holes 62, 64 and 66. The polyurethane potting 68 is provided with beveled shoulders 70 in order to provide support to the potted cable and to resist sea water pressure.

The second end plate 18 is of a slightly thicker dimension than the first plate 16 as generally shown in FIG. 2. The wet well canister 14 is fabricated from an aluminum alloy such as 6061-T6, although other compatible corrosion resistant materials can be used. The canister 14 is approximately 15" long with an outside maximum diameter of 10.625" and a smooth inside diameter of 7.981". The inside diameter is based on a standard 8" pipe. Both of the end plates are made from an aluminum alloy such as 6061-T6.

As will be more fully described hereinbelow, the conductivity sensor 22 includes an exit or exhaust port 72 through which sea water supplied to the temperature sensor is exhausted into the wet well canister 14 thereby flooding the wet well canister with circulating water. From the inlet port 54 of the first end plate 16 to the temperature sensor 24, there is provided a fluid line 98 that ensures that sea water first passes through the temperature sensor 24 and then to the conductivity sensor 22 for accuracy, and then floods the wet well canister 14. Subsequent to passage through the first tubing 98 and contact with a temperature probe 25 of the temperature sensor 24, the sea water passes through tubing 100 to the conductivity sensor 22 and is exhausted from the conductivity sensor 22 via the exhaust or exit 72 thereof.

Each of the sensors 20, 22 and 24 within the wet well canister 14 must be mounted in a stationary manner therein, so that movement of the wet well canister and the pressure hull 10 does not cause the sensors to vibrate within the wet well canister 14 and thereby distort the sensor capabilities thereof. The internal hardware in the wet well canister 14 simply secures the oceanographic sensors and plumbing in position.

FIGS. 3–6 particularly indicate the mounting of each of the sensors which are braced together as a unit by two lexan (acrylic) clamping fixtures. These are generally identified as clamping fixture 76 in FIG. 4 and clamping fixture 77 in FIG. 6. Each clamping fixture includes three corrosion resistant braces including a first brace 78, a second brace 80, and a third brace 82. The center or second brace 80 diametrically spans the interior of the wet well canister 14 and internally supports each of the sensors as shown particularly in FIGS. 4 and 6. The first brace 78 and third brace 82 are mounted opposite to the second brace 80 to clamp each of the sensors from an external peripheral side of each.

Figure 6:
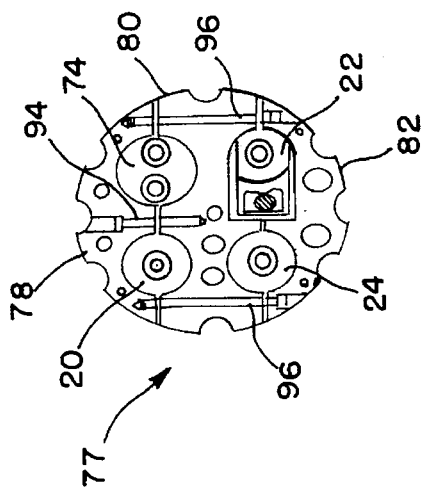
FIG. 6 is an end view taken along line 6—6 in FIG. 5.

The braces 78, 80 and 82 are fixed together in a radial manner by the use of a first joining screw 94 as particularly shown in FIG. 6, the first joining screw 94 extending from the first brace 78 to the second brace 80 in a radial manner. A pair of second joining screws 96 are provided which extend radially through each of the third, second and first braces 82, 80 and 78. Thus, the braces are secured to function as a plate like a disk shaped member as particularly shown in FIGS. 3, 4, 5 and 6.

Figure 3:
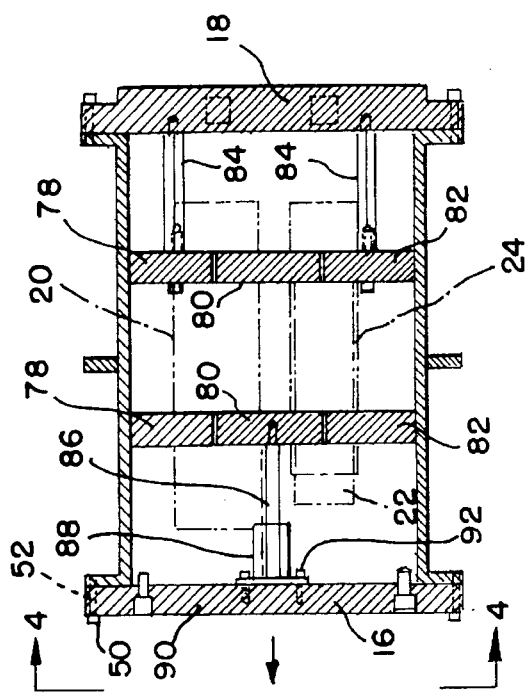
FIG. 3 is a side view of the wet well shown in FIG. 2 with a first end plate at a left end of the figure and further including mounting components.
Figure 5:
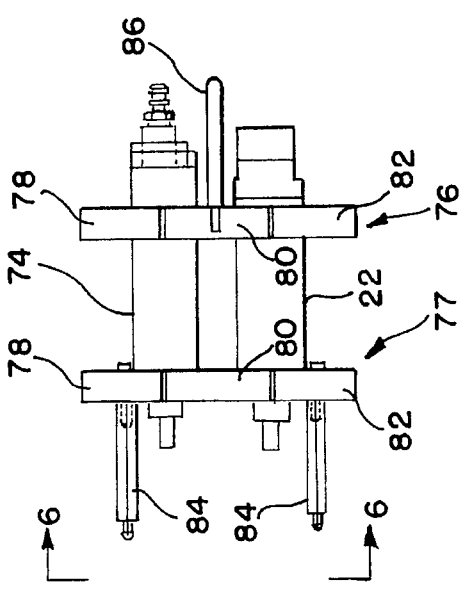
FIG. 5 is a side view of mounting components of the wet well shown in FIG. 2 without end plates and from an opposite side to that shown in FIG. 3.

In order to additionally secure the braces or clamping fixtures 76 and 77 within the wet well 14, the second brace 80 of the clamping fixture 76 includes a guide post 86 axially extending therefrom toward the first end plate 16 as shown in FIG. 3 and FIG. 5. The guide post 86 mates with a guide sleeve 88, mounted to the first end plate 16 by a mounting bracket 90 secured to the end plate with screws 92. Specifically, the guide post 86 axially fits within the guide sleeve 88 in order to position the clamping fixture 76 with respect to the end plate 16. Each of the first brace 78 and third brace 82 of the clamping fixture 77 includes rigid standoffs or spacer bars 84 extending therefrom toward the second plate 18 and parallel to a longitudinal axis of the wet well canister 14. Spacer bars 84 are typically made from an anodized aluminum alloy, although any rigid corrosion resistant material can be used.

Accordingly, upon assembly with the end plates, the canister 14 appears as that shown in FIG. 3 with support of the sensors and internal pump being as shown with the clamping fixtures 76 and 77. FIG. 5 shows the clamping fixtures 76 and 77 in connection with the sensors and internal pump free of the canister 14 and the end plates 16 and 18, in order to better view the components thereof.

The high pressure line 26, as previously described, connects the inlet penetration 28 in the hull 10 to the inlet port 54 in the first end plate 16 of the wet well system. A line 30 runs from the wet well system first end plate 16 at the outlet 56 thereof to the external pump 34 at inlet 33 thereof. Another line runs from the external pump outlet 35 to a flow meter (shown) as 104 in FIG. 1. The last pressure line connects the flow meter 104 to the unmanned underwater vehicle pay load hull outlet port 32. Additionally provided in connection with the device, but not shown, are a wave tide recorder port, a wave tide recorder, a Doppler Velocity Sonar transducer, a sealogger/Conductivity Temperature Density recorder, an evacuation/backfill port, an Acoustic Command Link hydrophone plug, and a ballast station.

In operation, the oceanographic sensor suite wet well system introduces sea water from an ambient condition outside of the pressure hull 10 into the vehicle's dry atmospheric pressure hull 11 and circulates that water through oceanographic sensors 20, 22 and 24 embedded within the sensor wet well canister 14, and then discharges the water into the sea via an outlet port 32 at an adequate flow rate. FIG. 1 is a functional diagram which pictorially describes the operation indicated above and further discussed hereinbelow.

The ambient sea water is drawn into the wet well canister 14 via high pressure line 26 that connects the hull wall of the pressure hull 10 to the wet well 12. The sea water travels through the forward end plate inlet at 54 and directly and entirely via a tube 98 to the temperature sensor 24 via the inlet 54 and nipple 58. As indicated, the actual temperature probe 25 is shown inside the manifold in phantom.

The sea water then proceeds immediately via tube 100 to the conductivity sensor 22. The direct and primary path from the ambient sea water to the temperature probe 25 to the conductivity sensor 22 is necessary to ensure an accurate reading of particular oceanographic properties.

The sea water discharges from the conductivity sensor 22 at 72 and then floods the wet well 12 to a pressure equal to that of the ambient sea water. Water exiting the conductivity sensor at 72 is shown with two arrows at the left end of the diagram in FIG. 1.

The external pump 34 is the primary mover of sea water in the wet well system. The external pump 34 draws the water through the wet well 12. The external pump 34 is attached to the wet well forward end plate 16 at the outlet port 56 thereof, and discharges sea water back into the sea via a flow meter 104. The flow meter 104 ensures that the system is circulating water at an appropriate rate for the oceanographic sensors to conduct accurate readings.

The system described allows the sensors to be mounted internal to the pressure hull 10 and yet still permit the oceanographic sensors to operate in a full pressure free flood environment with circulating water. The wet well system is relatively small and has no effect on vehicle drag and hydrodynamic noise.

The external pump 34 is sized to provide the specified flow rate through the oceanographic sensors, and the flow meter allows the vehicle computer to monitor the flow rate to ensure proper performance. Pump suction causes a negligible error on the pressure sensor readings due to the pressure drop of the suction head. The configuration of the inlet and outlet lines allows the wet well to flood when the vehicle is submersed in the launch cage before the external pump is turned on.

The system described is advantageous in providing an oceanographic sensor suite designed to be submersed in a flooded environment and utilized inside of an underwater vehicle with a dry environment within its pressure hulls. There is no need for an entire flooded hull section in a vehicle to use these sensors. The wet well system also avoids the mounting of these sensors external to the volume of the underwater vehicle which could interfere with a tube launch or recovery scenario.

Referring now to FIG. 7, there is shown an alternate embodiment of the current invention wherein an internal pump 120 is provided within wet well canister 14. Mounting of pump 120 within wet well canister 14 guards against flooding of pressure hull 10 if an external pump should fail.

Figure 8:
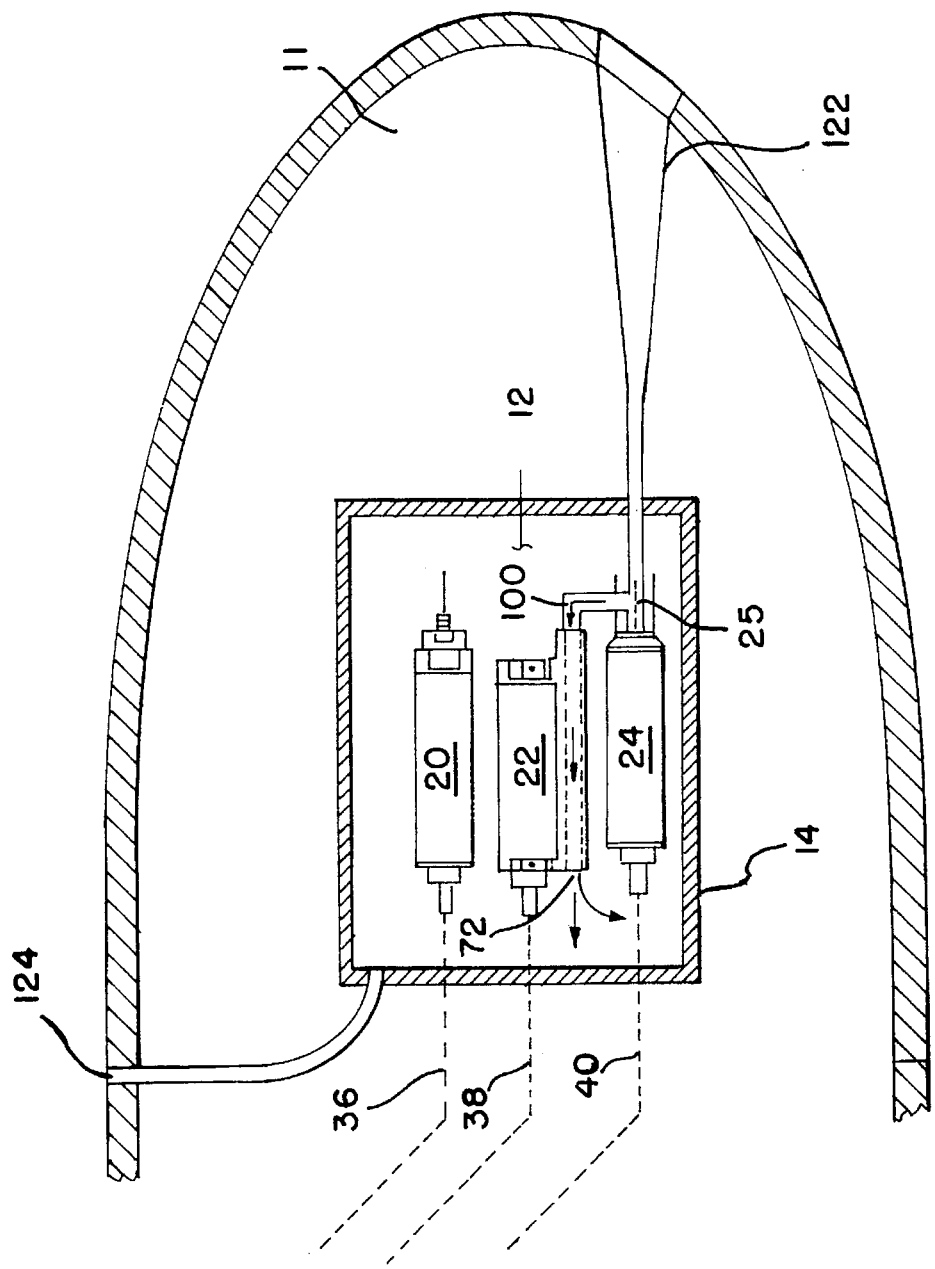
FIG. 8 is a functional diagram of another alternate embodiment of the present invention.

In FIG. 8, an alternative embodiment of the invention having a passive fluid circulation system is shown. Intake 122 is enlarged to receive fluid external to vehicle hull 10. Intake 122 narrows to increase the pressure differential across canister 14. Upon entering canister 14, intake 122 is joined to provide environmental water to temperature probe 25. A fluid exhaust port 124 is positioned to discharge water from canister 14 at a lower pressure region external to vehicle hull 10.

Materials used in any and all parts of the wet well system can be modified as long as the materials utilized are capable of supporting the loads and pressures that the environment and wet well system imposes upon them. The primary mover of sea water in the wet well system is defined, as the external pump 34, however any external pump with adequate power and pressure ratings may be used. An internal pump positioned inside the flooded wet well canister 14 can also be used provided it has adequate power and pressure capability. An additional option is to circulate the sea water with a passive system having no pump. Such a passive system could utilize a pressure delta caused by hydrodynamic flow over the vehicle's changing diameter contours in lieu of a pump.

Finally, the geometry of the canister 14 and end plates 16 and 18 can be any variety of geometries and the internal mounting components may change in appearance while still performing their intended tasks as described above.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A wet well sensor system comprising:
   a housing member having a housing member wall with a fluid inlet and a fluid outlet formed therein;
   a canister portion positioned within said housing member having a side wall and opposing end walls mounted in a fluid tight manner to said side wall and defining a cavity therein, said canister portion having an inlet port formed in one said end wall of said canister portion and in communication with the fluid inlet of said housing member, and an outlet port formed in one side end wall of said canister portion and in communication with the fluid outlet of said housing member;
   a plurality of sensor members positioned within said canister portion, each of said plurality of sensor members having a dry cable attached thereto for supplying sensed information to a location exterior of said canister portion and interior to said housing member;
   means for stationarily mounting said plurality of sensor members within said canister portion; and
   means for circulating fluid from the fluid inlet to said fluid outlet of said housing member and intermediately through said canister portion, such that fluid is prevented from filling said housing member interior.

2. The wet well sensor system according to claim 1 wherein said plurality of sensor members includes a temperature sensor, a conductivity sensor, and a pressure sensor.

3. The wet well sensor system according to claim 2 wherein said temperature sensor is directly fluidly connected to said conductivity sensor.

4. The wet well sensor system according to claim 3 wherein said inlet port first communicates with said temperature sensor, said temperature sensor transmitting fluid to said conductivity sensor, said conductivity sensor transmitting fluid to said cavity of said canister for contact with said pressure sensor.

5. The wet well sensor system according to claim 1 wherein said means for circulating fluid includes a pump positioned inside said housing member, outside said wet well, and in line between the outlet port of said canister and said housing member fluid outlet.

6. The wet well sensor system according to claim 1 wherein said means for circulating fluid includes a pump positioned inside said canister cavity, said pump being in communication with said canister outlet port.

7. The wet well sensor system according to claim 1 wherein said means for stationarily mounting said plurality of sensor members includes a clamping fixture having openings formed therein for conformably and individually receiving each of said plurality of sensor members longitudinally therethrough and having an outer peripheral configuration conforming to said canister wall portions.

8. The wet well sensor system according to claim 7 wherein said clamping fixture includes a first brace formed to span said cavity and including recesses on opposing edges thereof corresponding to each of said plurality of sensor members, and a pair of second brace sections having complementary recesses on inner edges thereof, said recesses and complementary recesses defining apertures allowing each of said plurality of sensors to be mounted between said first brace and one corresponding said second brace.

9. The wet well sensor system according to claim 8 wherein a pair of said clamping fixtures are provided within said canister and substantially equidistantly spaced from each other.

10. The wet well sensor system according to claim 9 further comprising at least one spacer member joined between each said clamping member and said canister wall.

11. The wet well sensor system according to claim 10 further comprising connectors joining said first brace section to said second brace sections.

12. A wet well sensor system comprising:
    a hull member having environmental water on the outer surface thereof, said hull member defining a dry inner volume, said hull member having a fluid inlet aperture and a fluid outlet aperture therein;

a canister disposed in said hull member and having a side wall and two opposing end walls defining a cavity therein, said canister having an inlet port formed in one said wall, said inlet port being in communication with said hull member fluid inlet aperture, and an outlet port formed in one said wall, said outlet port being in communication with said hull member fluid outlet aperture, said inlet port and outlet port allowing communication of environmental water into said cavity;

a plurality of sensor members mounted in said canister, said sensor members being in electrical communication with said hull member dry inner volume; and means for circulating environmental water from said hull member fluid inlet aperture through said canister cavity to said hull member fluid outlet aperture.

13. The wet well sensor system according to claim 12 wherein said means for circulating environmental water comprises a pump located inside said canister cavity.

14. The wet well sensor system according to claim 12 wherein said means for circulating environmental water comprises a pump located inside said hull member and outside said canister.

15. The wet well sensor system according to claim 12 wherein said means for circulating environmental water comprises said fluid intake aperture being positioned to receive environmental water having a greater pressure than that at said fluid outlet aperture.

* * * * *